(12) United States Patent
Stufflebeam, Jr.

(10) Patent No.: US 7,058,738 B2
(45) Date of Patent: Jun. 6, 2006

(54) CONFIGURABLE PCI EXPRESS SWITCH WHICH ALLOWS MULTIPLE CPUS TO BE CONNECTED TO MULTIPLE I/O DEVICES

(75) Inventor: Kenneth W. Stufflebeam, Jr., Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 134 days.

(21) Appl. No.: 10/834,138

(22) Filed: Apr. 28, 2004

(65) Prior Publication Data

US 2005/0246460 A1   Nov. 3, 2005

(51) Int. Cl.
*G06F 13/00* (2006.01)
*G06F 3/00* (2006.01)
*G06F 13/14* (2006.01)
*G06F 13/20* (2006.01)
*G06F 13/36* (2006.01)
*H04L 12/28* (2006.01)

(52) U.S. Cl. .................. 710/104; 710/15; 710/100; 710/305; 710/313; 710/314; 710/316; 710/317; 370/389

(58) Field of Classification Search .................. 710/15, 710/100, 104, 305, 313–317; 370/389
See application file for complete search history.

(56) References Cited

U.S. PATENT DOCUMENTS 5,771,387 A * 6/1998 Young et al. ............... 710/260
5,968,150 A * 10/1999 Kametani ................... 710/100
2002/0049878 A1 * 4/2002 Biran ......................... 710/305
2004/0054822 A1 * 3/2004 Biran et al. .................. 710/15
2005/0044284 A1 * 2/2005 Pescatore .................... 710/15
2005/0117578 A1 * 6/2005 Stewart et al. .............. 370/389
2005/0125590 A1 * 6/2005 Li et al. ...................... 710/317

OTHER PUBLICATIONS

Sassone, Peter, Commercial Trends in Off-chip Communcation, May 2003, Georgia Institute of Technology, Microelectronics Research Center, School of Electrical and Computer Engineering.*
Recio, R.J., "Server I/O networks past, present and future," *Proceedings of the ACM SIGCOMM 2003 Workshops*, 2003, 163-178.

* cited by examiner

*Primary Examiner*—Rehana Perveen
*Assistant Examiner*—Faisal Zaman
(74) *Attorney, Agent, or Firm*—Woodcock Washburn LLP (57) ABSTRACT

A configurable switch that enables multiple CPUs to be connected to multiple I/O devices through a single switch. The switches can be cascaded to enable more CPUs and/or more I/O devices in the tree. The configuration is transparent to the enumeration of the bus and endpoint devices. A simple management input such as SMBus or hardware strapping is used to set up the assignation of devices to CPUs. Utilization of a manager and the PCI Express hot plug controller registers enable hot-plug reconfiguration of the device tree as devices a switched between CPUs via PCI buses within the switch.

15 Claims, 7 Drawing Sheets

CONFIGURABLE PCI EXPRESS SWITCH WHICH ALLOWS MULTIPLE CPUS TO BE CONNECTED TO MULTIPLE I/O DEVICES

FIELD OF THE INVENTION

The present invention generally relates to the field of computing devices. More particularly, the present invention relates a configurable switch for use with PCI Express that enables the connection of multiple upstream ports to multiple downstream ports.

BACKGROUND OF THE INVENTION

During the early 1990s, the Peripheral Component Interconnect (PCI) standard was introduced. PCI provided direct access to system memory for connected devices, but uses a bridge to connect to the frontside bus and to the CPU. PCI can connect multiple components. A PCI bridge chip regulates the speed of the PCI bus independently of the CPU's speed to enable a higher degree of reliability and to ensure that PCI-hardware manufacturers have consistent design constraints. PCI supports Plug and Play which enables a device or card to be inserted into a computer and automatically recognized and configured to work with the system.

Today's software applications are more demanding of the platform hardware, particularly the I/O subsystems. Streaming data from various video and audio sources are now commonplace on the desktop and mobile machines. Applications such as video-on-demand and audio redistribution are putting real-time constraints on servers too. The PCI architecture no longer is able to cope with these demands and a new standard has been proposed called PCI Express.

Figure 1:
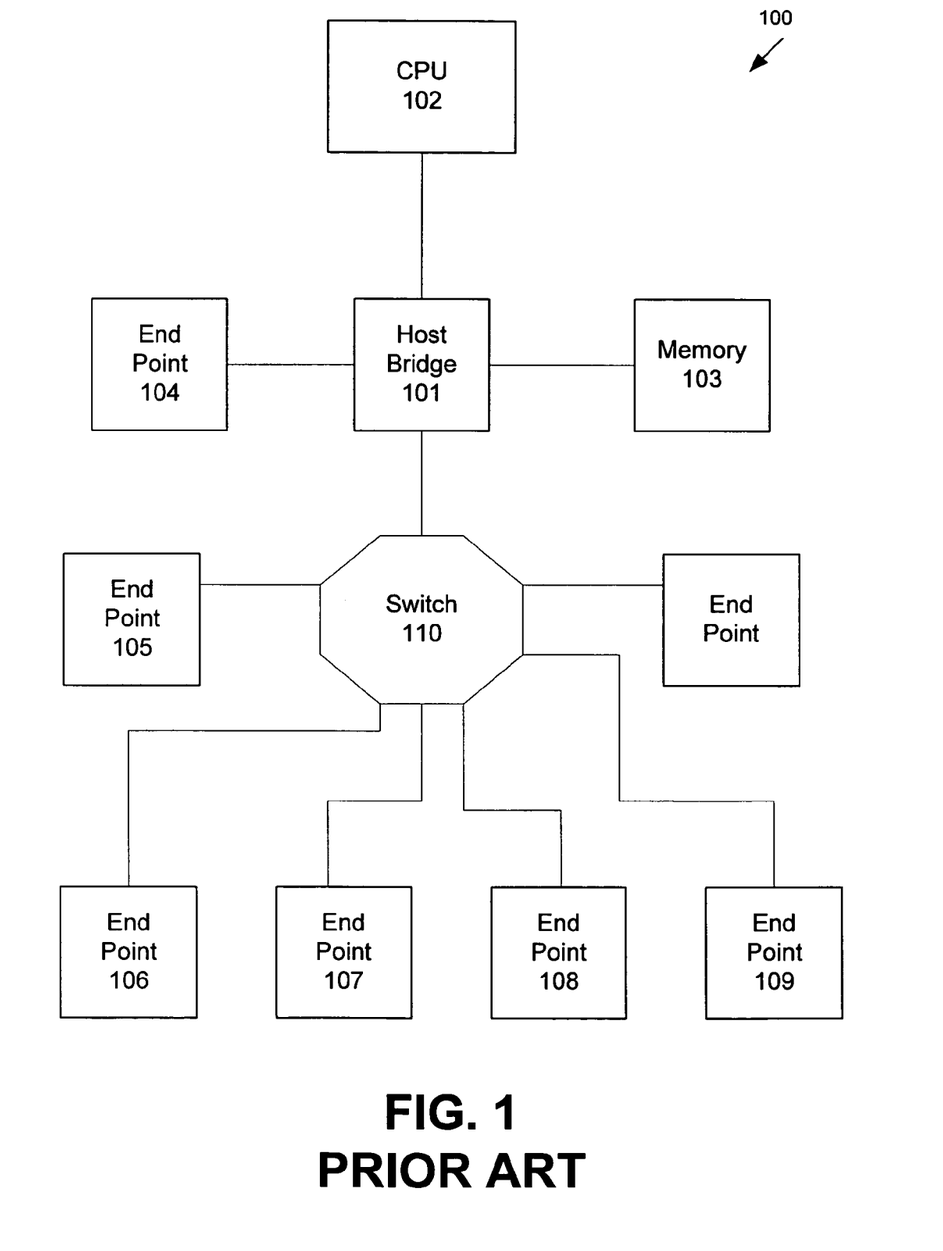
FIG. 1 is a block diagram showing a conventional personal computer.

Referring to FIG. 1, there is illustrated a PCI Express topology 100 that would be included in a computing device. The topology contains a Host Bridge 101 and several endpoints 104–109 (i.e., the I/O devices) in addition to a CPU 102 and memory 103. Multiple point-to-point connections are accomplished by a switch 110. The switch 110 replaces the multi-drop bus used by PCI and is used to provide fan-out for the I/O bus. The switch 110 may provide peer-to-peer communication between different endpoints 104–109, and this traffic if it does not involve cache-coherent memory transfers, need not be forwarded to the host bridge 101. The switch 110 is shown as a separate logical element but it could be integrated into the host bridge 101.

While this is an improvement over the older PCI architecture, it does not provide a way to connect and share end points among different computing devices. Thus, there is a need for a system and method of sharing of end points. Such a system would greatly enhance the flexibility of computing devices, as well as provide for methods to reduce power consumption. The present invention provides such a solution.

SUMMARY OF THE INVENTION

This invention will allow multiple CPUs to be connected to multiple I/O devices through one switch. The switches can be cascaded to enable more CPUs and/or more I/O devices in the tree. This method of configuration is transparent to the enumeration of the bus and endpoint devices. A simple management input such as SMBus or hardware strapping is all that is required to set up the assignment of devices to CPUs.

In accordance with an aspect of the invention, there is provided a configurable PCI Express switch that includes a plurality of upstream PCI-to-PCI ports, a plurality of downstream PCI-to-PCI ports, internal PCI buses that are uniquely associated with an upstream port, and a controller that configures which upstream port communicates to which downstream port.

In accordance with another aspect of the invention, there is provided a method of controlling a configurable PCI Express switch. The method includes reading a PCI configuration space registry, discovering one of a plurality of upstream PCI-to-PCI bridges, discovering a control interface associated with a bus associated with one of the plurality of upstream PCI-to-PCI bridges, and enumerating devices discovered on the bus.

In accordance with yet another aspect of the invention, there is provided a configurable PCI Express switch connecting a plurality of CPU complexes. The switch includes a plurality of upstream PCI-to-PCI bridges that are each uniquely connected to one of the CPU complexes, a plurality of downstream PCI-to-PCI bridges, a plurality of internal PCI buses that are each connected to a unique (or single) upstream port, and a controller that configures which upstream port communicates to which downstream port. Each downstream port is connected to each internal PCI bus and each downstream port only responds to one internal PCI bus. Also, the controller receives discovery requests through an interface associated with each CPU complex.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Figure 2:
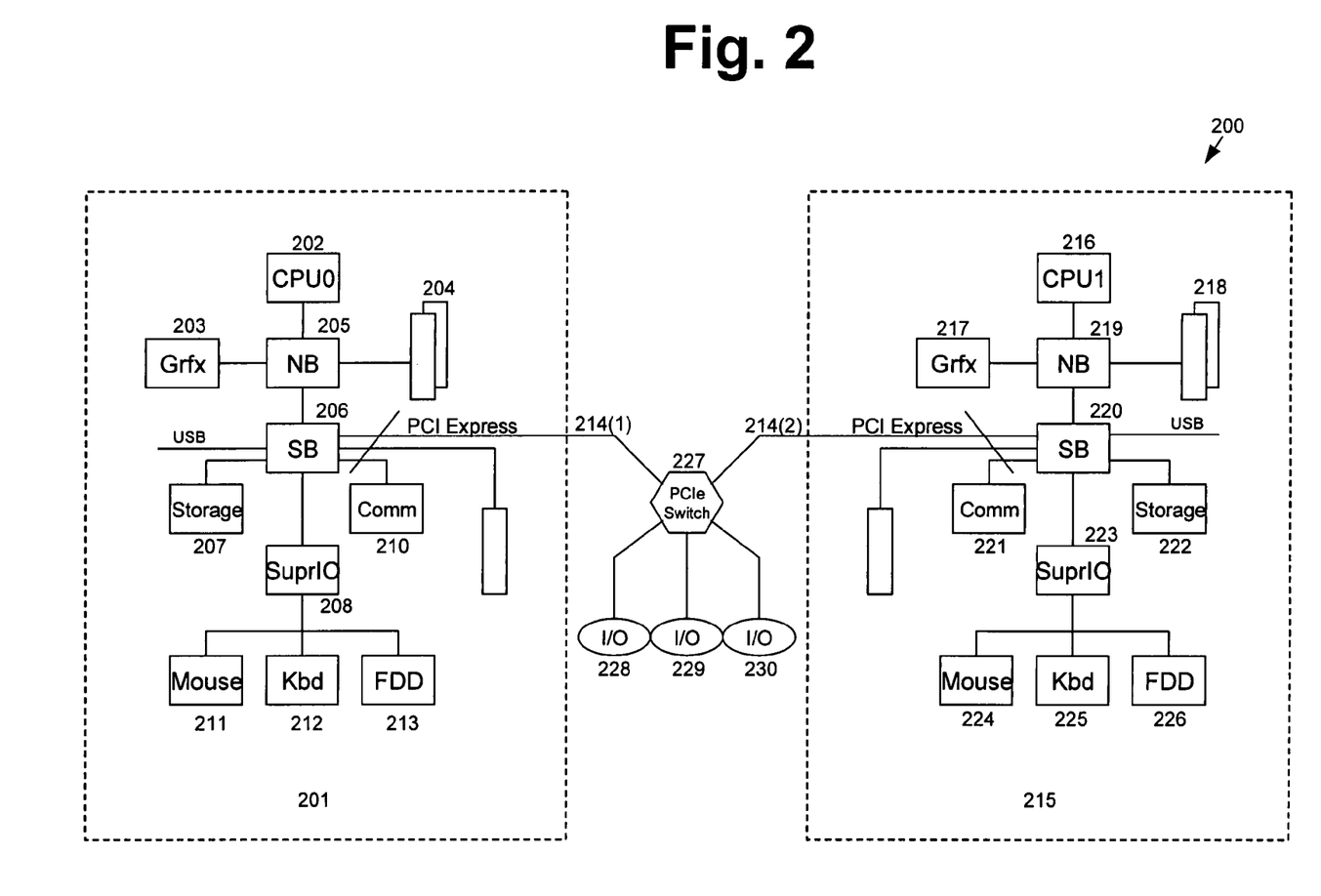
FIG. 2 is a block diagram of a general system for sharing components using a configurable PCI Express switch in accordance with the present invention.

Referring now to FIG. 2, there is illustrated an overview of a system 200 for sharing components. As PCI Express supplants PCI and multiple CPUs become a standard implementation in computing devices, flexible configuration of standard system components will become a very desirable feature. The ability to dynamically reconfigure a set of hardware resources based on hardware available and application requirements is a desirable feature for client desktop PCs. The present invention provides for simple control methods to configure system configurations as required by users and applications. The present invention, however, is not limited to desktop designs, as it is applicable servers and other computing devices employing PCI Express and similar architectures.

FIG. 2 demonstrates a configurable switch design that supports two up-stream CPU topologies designated 201 and 215. The first system topology 201 is illustrated as a typical PC computer which may comprise a CPU 202, graphic card 203, system bus, memory 204, a chipset (Northbridge 205 and Southbridge 206), a storage device 207 (e.g., hard disk, flash memory, etc.), a communications device 210 (e.g., a MODEM, NIC, etc.), and a super I/O controller 208 connected to a mouse 210, keyboard 211 and floppy disk drive 213. A PCI Express bus 214(1) is connected to a configurable PCI switch 227. Similarly, the second system topology 215 includes a CPU 216, graphic card 217, system bus, memory 218, a chipset (Northbridge 219 and Southbridge 220), a storage device 222, a communications device 221, and a super I/O controller 223 connected to a mouse 224, keyboard 225 and floppy disk drive 226. A PCI Express bus 214(2) is connected to the PCI switch 227. The PCI Express switch is connected to I/O devices 228–230.

Figure 3:
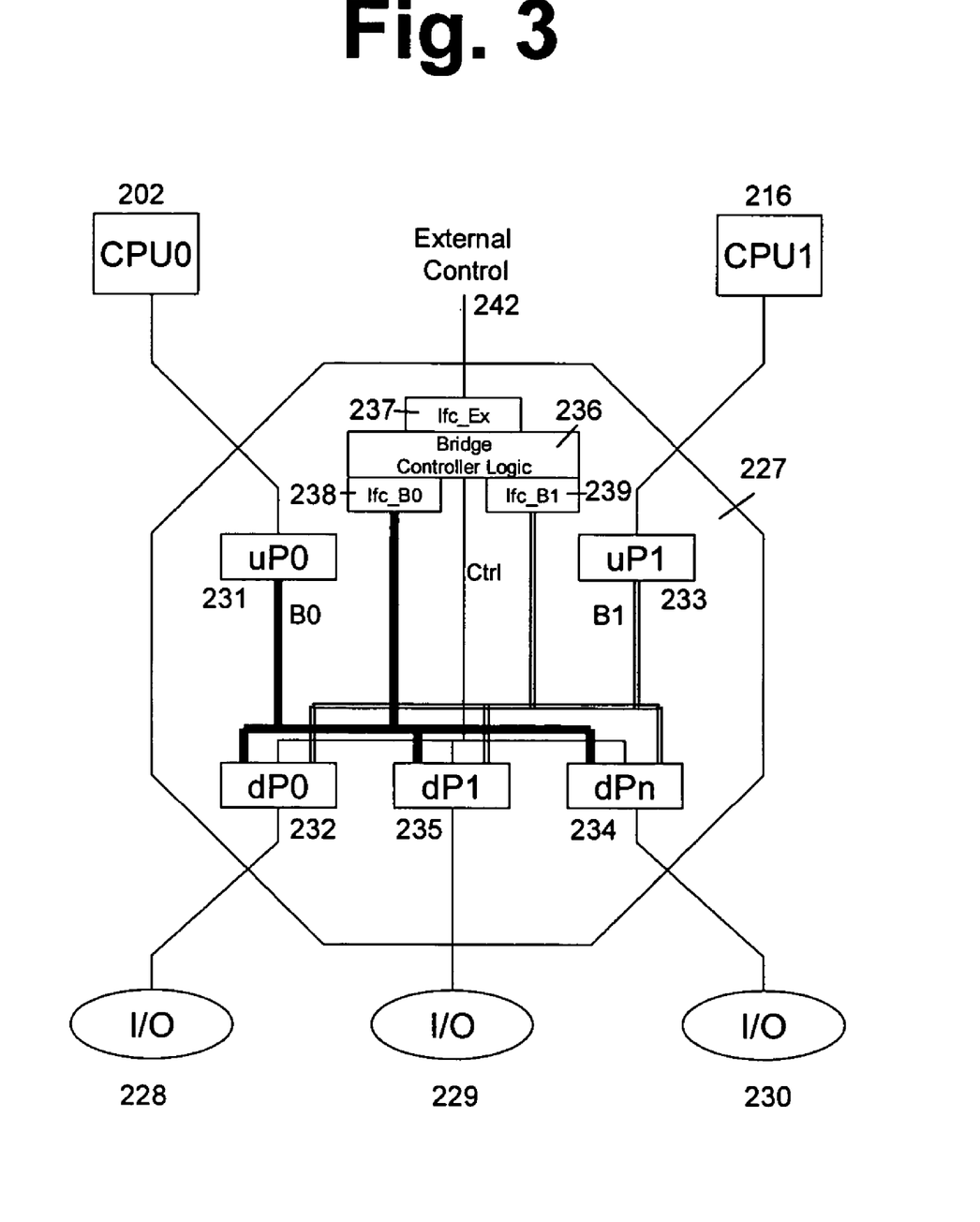
FIG. 3 is a block diagram of the configurable PCI Express switch.
Figure 4:
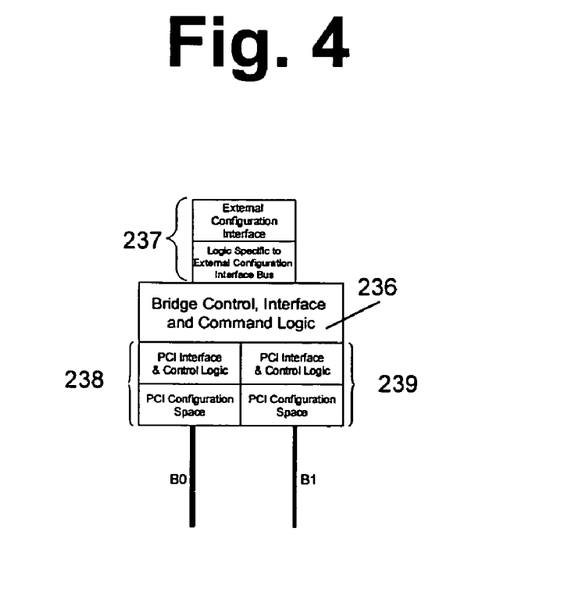
FIG. 4 is a block diagram of control interface and command logic to configure the PCI Express switch.

Referring now to FIGS. 3 and 4, there is illustrated the configurable PCI switch 227 in greater detail. In the Figs., "u" designates an upstream port; "P" represents PCI-to-PCI (P2P); "d" designates a downstream port; "B0", "B1", "B2" represent PCI Express internal PCI buses associated with upstream ports; and "0", "1", "2" and "n" designate signal pathing or ports.

As defined in the PCI Express specification, a PCI Express switch is modeled as a set of PCI-to-PCI (P2P) bridge devices. An upstream P2P bridge (connected to a host controller or another PCI bus) connects to a common PCI bus in which the only devices to be found on that (internal) PCI bus are (downstream) PCI-to-PCI bridges in turn connected to a PCI device on the output. Thus, a typical PCI Express switch would be composed of only one upstream P2P bridge connected to a CPU/chipset host controller, an internal PCI bus, and a set of downstream P2P bridges.

The present invention advantageously implements a set of upstream PCI-to-PCI bridges for purposes of expanding the fan-out of the PCI Express point-to-point architecture. As shown in FIG. 3, n upstream P2P bridges as indicated by uP0 231 and uP1 233 each with its independent internal PCI bus as indicated by B0 and B1, and multiple downstream P2P bridges indicated by dP0 232, dP1 235 and dPn 234. It is preferable that each downstream P2P bridge connects to each internal PCI bus. Unlike a conventional PCI Express switch, each downstream P2P bridge is configurable to respond to the enumeration exercises of either internal PCI bus B0 or B1.

The control method consists of an internal configuration control register or an external hardware strap or other external configuration management interface External Control 242. The control method defines which bus the downstream P2P bridge (232, 234 and 235) are to respond to. Communications from other PCI buses are ignored. For example, at the end of a power-up sequence, an arbitrary methodology assigns resources (I/O and dPx) to buses B0 or B1 for purposes of initial configuration. As such, the downstream ports (dPx) respond to cycles from either internal bus B0 or B1, but not both. A physical connection exists, but responses can only occur to cycles on bus B0 or bus B1.

FIG. 4 is a detailed illustration of a bridge control logic 236 with its associated external bus and configuration interface 237 for PCI enumeration and discovery, its internal PCI bus configuration interface for bus 0 (238) and internal PCI bus configuration interface for bus 1 (239). During device enumeration and configuration, the operating system running on CPU0 202 discovers devices by reading the PCI Configuration Space registry contents. CPU0 202 will discover the PCI-to-PCI bridge found in uP0 231. The operating system will enumerate devices found on the bus B0 and will discover the control interface Ifc_B0 238 associated with switch internal bus B0. This device has a unique bridge identification number that identifies it as a configurable PCI Express switch. The interface Ifc_B0 238 is, therefore, associated with the switch's internal bus B0. It may be a master or a target of configuration and I/O cycles on B0. CPU0 202 will then enumerate all devices discovered on bus B0.

When finished, CPU0 202 will initiate a discovery request to the switch controller through Ifc_B0 238 interface. The controller can then initiate configuration requests and read the configuration space for each device on bus B1, or initiate a request through Ifc_B1 239 to CPU1 216 requesting devices enumerated on bus B1. After the information requested by CPU0 202 has been gathered, the switch controller will initiate a response through Ifc_B0 238 to CPU0 202 and return the information requested. This mechanism thus enables both CPU0 202 and CPU1 216 to determine what devices might be available upon request.

The external control interface provided by the external control 237 enables a bus manager performing in a supervisory capacity to assign down stream resources (I/O) to either CPU0 202 or CPU1 216. The external control 237 performs this function by asking the bridge controller logic 236 what devices are available from the configurable switch's internal buses B0 and B1. This feature is especially desirable in a server architecture when assigning resources based on CPU/Operating System responsibilities and when tasks are being assigned to each up-stream server entity.

When a CPU0 202 desires resources assigned to CPU1 216, it will initiate a request for the current downstream (dPx) port or endpoint (I/O) through Ifc_B0 238. The bridge controller logic 236 will then initiate a request to CPU1 216 to release the downstream port. If the request is granted, CPU1 216 will acquiesce the endpoint and initiate a grant to the bridge controller logic 236 through Ifc_B1 239 for the release of the downstream port (dPx). The bridge controller logic 236 will then instruct the downstream port (dPx) to perform a PCI Express disconnect sequence from B1 through the switch port control interface. When disconnected, the bridge controller logic 236 will instruct the downstream port (dPx) to perform a connect sequence to B0 through the switch port control interface. When connected, CPU0 202 will receive a hot-plug event, as defined within the PCI architectural specification. When notified of the event, CPU0 202 will enumerate the device and load the appropriate driver associated with it thus completing the transition.

If CPU1 216 declines the grant request, CPU1 216 initiates a message through Ifc_B1 239 to CPU0 202 informing the originator of the declined request. The bridge controller logic 236 initiates a response to CPU0 202 through its interface Ifc_B0 238 to CPU0 202 across B0, thus completing the decline sequence.

Figure 5:
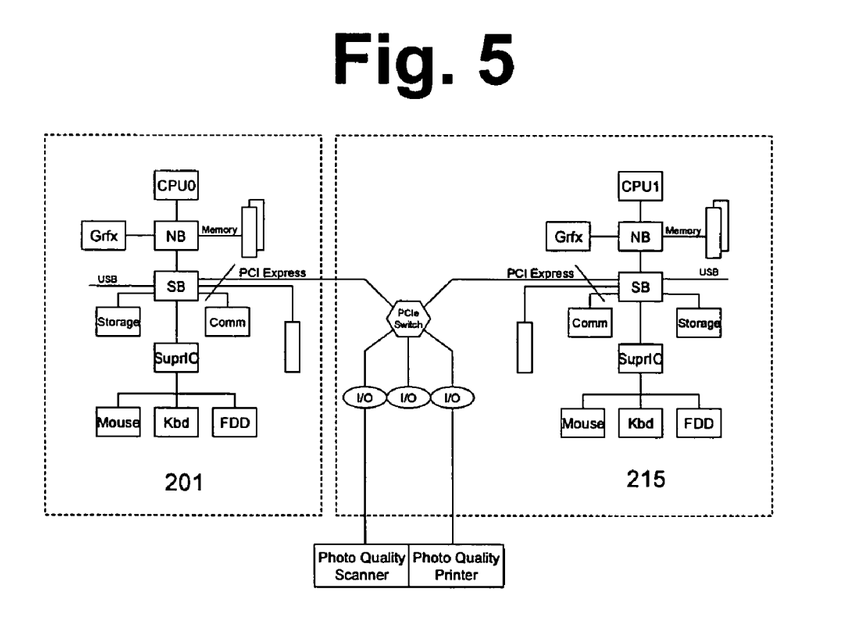
FIG. 5 is a block diagram of exemplary systems sharing components in accordance with the present invention.

Referring now to FIG. 5, there is illustrated an example in which a docked laptop PC (system 201) and an Enhanced Docking Station (system 215) both share resources associated through the configurable switch. When an application is loaded on the laptop and the user desires to acquire a photo utilizing a scanner currently configured by the Enhanced Docking Station topology, the laptop PC will request ownership of the scanner. When the user desires to print the scanned and manipulated photo acquired through the scanner, the laptop PC topology will request ownership of the photo quality printer associate with the Enhanced Docking Station. When the laptop PC is undocked, all resources associated with the laptop PC through the configurable switch are disassociated and the configurable switch will then reassign the resources to the Enhanced Docking Station for utilization within that topology.

Figure 6:
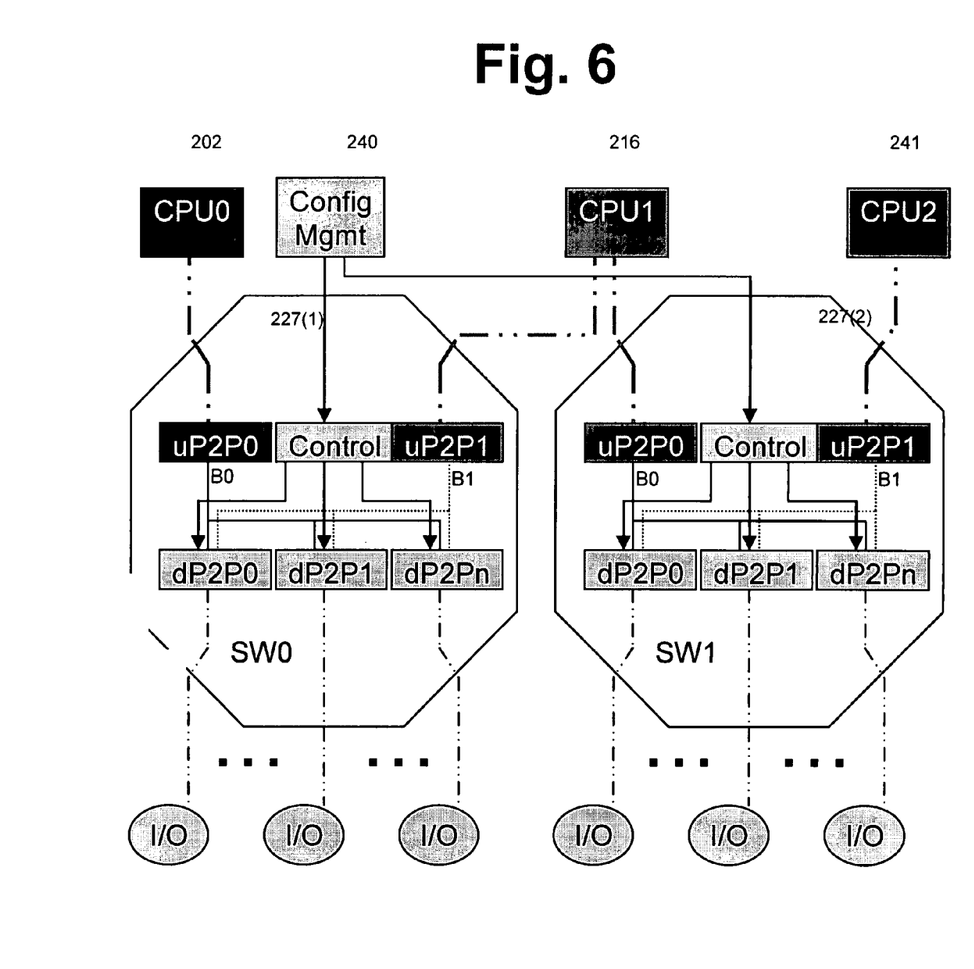
FIGS. 6–8 are block diagrams illustrating several embodiments of component sharing using configurable PCI Express switches.

FIG. 6 illustrates how a CPU complex with multiple PCI Express buses could be configured to utilize I/O devices through multiple configurable PCI Express switches. In this example, CPU1 216 interfaces to switches SW0 227(1) and SW1 227(2). Any I/O device connected to SW0 and SW1 can then be assigned to CPU1 216. Only downstream P2P bridges within SW0 can be assigned to CPU0 202 and only downstream P2P bridges within SW1 can be assigned to CPU2 241 in this configuration.

Figure 7:
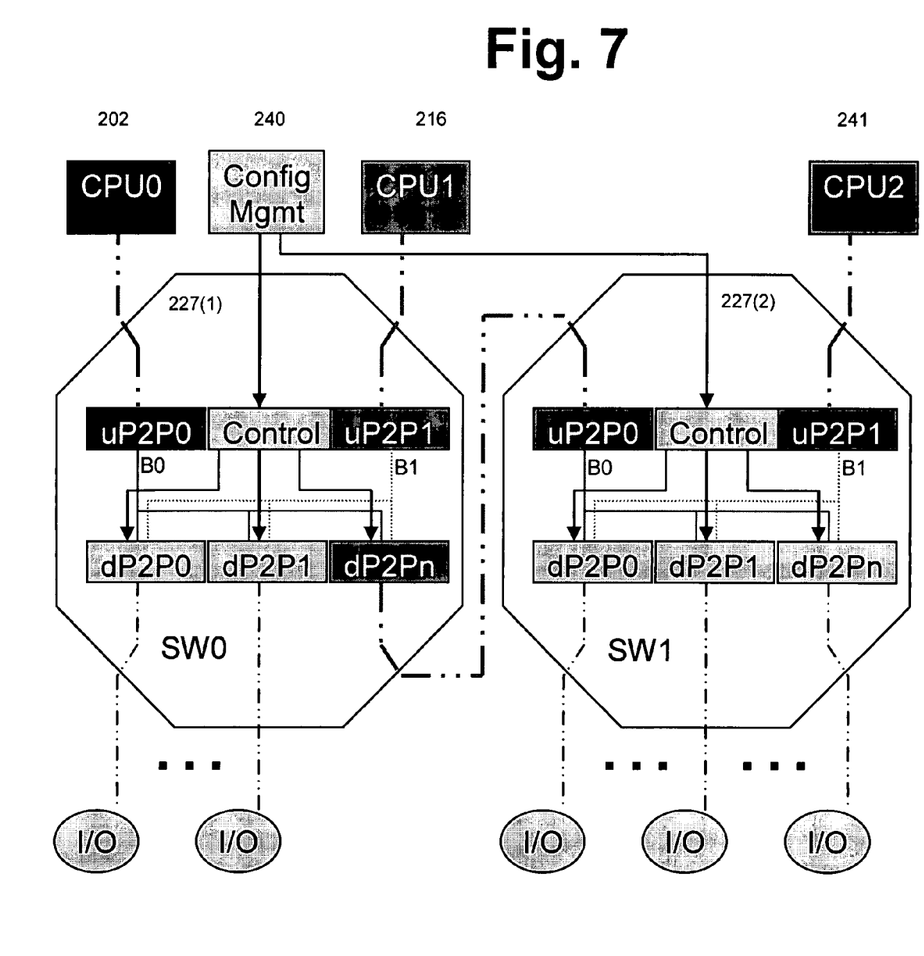

FIG. 7 is a modification of FIG. 6. Rather than share bandwidth between multiple switches, FIG. 7 illustrates an ability to utilize the full bandwidth available from CPU1 216 to both switches.

Figure 8:
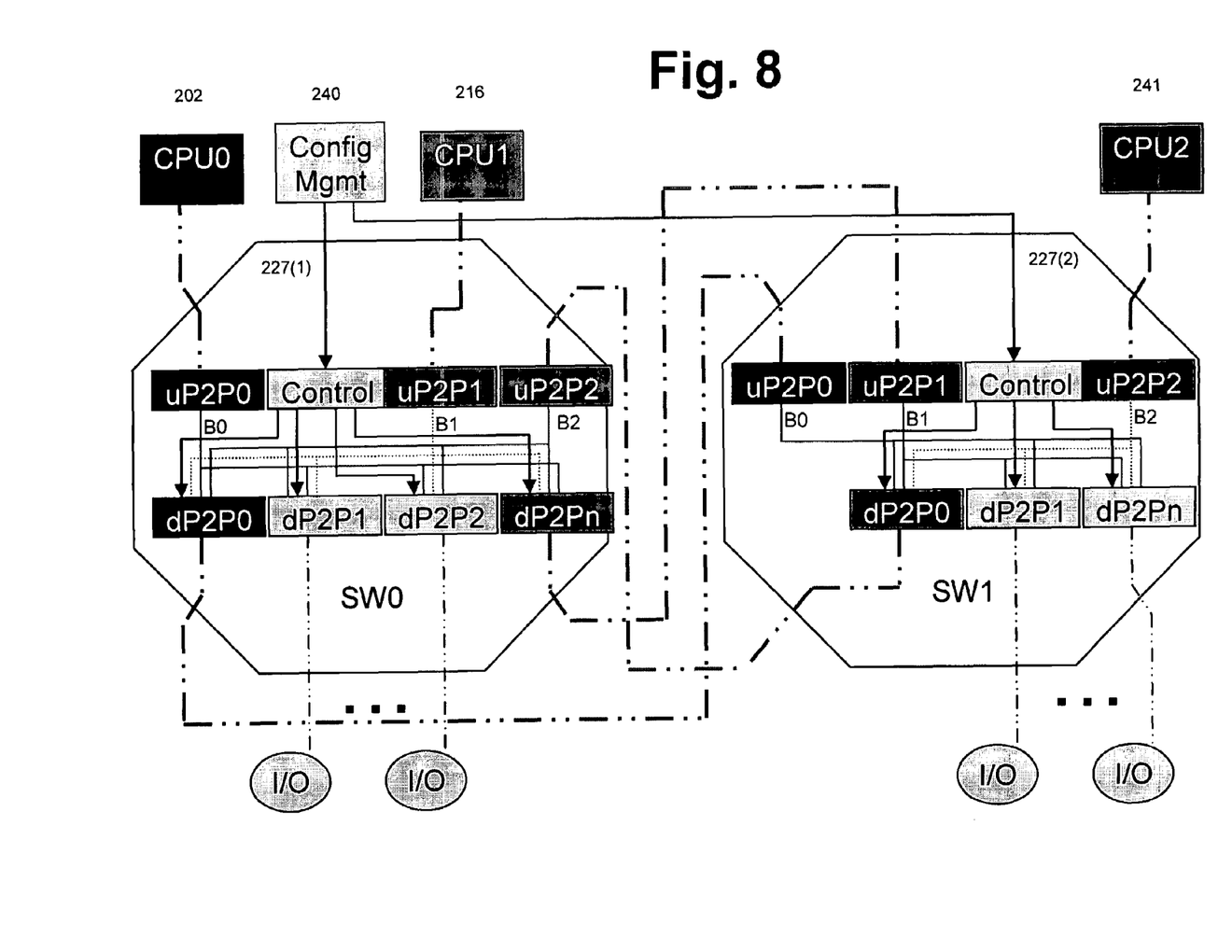

FIG. 8 is yet another example of three CPU complexes 202, 216 and 241 having access to all the resources within two switches SW0 and Sw1. While FIG. 8 is another example of the switch scalability, it is also useful in illustrating the associated internal switch complexity of adding upstream CPU complexes. Further, while it may appear that this implementation of multiple upstream P2P bridges consumes downstream bridges, this however, is not the case as downstream P2P bridges are more easily added to a design than upstream bridges.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A configurable PCI Express switch, comprising:
a plurality of upstream PCI-to-PCI ports;
a plurality of downstream PCI-to-PCI ports;
an internal PCI bus associated with each upstream port; and
a controller that configures which upstream port communicates to which downstream port,
wherein a CPU in communication with a predetermined one of said upstream ports is configurable to communicate with any of said downstream ports,
wherein said CPU discovers devices by reading a PCI configuration space registry and enumerates devices found on a PCI bus associated with said CPU, wherein said devices are connected to downstream ports in communication with said predetermined one of said upstream ports,
wherein if a second CPU requests access to a device enumerated to said CPU, said controller initiates a request to said CPU to release a downstream port to which said device is connected, and
wherein if said request is granted, said CPU acquiesces said device and initiates a grant to said controller for the release of the downstream port.

2. The switch of claim 1, wherein each said internal PCI bus is connected to each downstream port.

3. The switch of claim 1, wherein said controller instructs said downstream port to perform a disconnect sequence from said bus associated with said CPU, and said controller instructs the downstream port to perform a connect sequence to a bus associated with said second CPU.

4. The switch of claim 1, wherein an internal configuration control register is used to define to which internal bus each of said downstream ports is to respond.

5. The switch of claim 1, wherein hardware strap is used to define to which internal bus each of said downstream ports is to respond.

6. The switch of claim 1, wherein an external configuration management interface is provided for configuration control by an external configuration management entity.

7. The switch of claim 1, wherein each downstream port is connected to each internal PCI bus and wherein each downstream port only responds to one internal PCI bus.

8. A method of controlling a configurable PCI Express switch, comprising:
reading a PCI configuration space registry;
discovering one of a plurality of downstream PCI-to-PCI bridges;
discovering a control interface for a bus associated with said one of said plurality of upstream PCI-to-PCI bridges; and
enumerating devices discovered on said bus,
wherein if a first CPU requests access to a device enumerated to a second CPU, a controller initiates a request to said second CPU to release a downstream port to which said device is connected, and
wherein if said request is granted, said second CPU acquiesces said device and initiates a grant to said controller for the release of the downstream port.

9. The method of claim 8, further comprising:
initiating a discovery request to a controller through an interface;
reading a configuration space for each device on said bus; and
responding through said interface to return information requested by said discovery request.

10. The method of claim 8, further comprising:
assigning downstream resources to one of a plurality of CPUs, each of said CPUs being associated with said one of said plurality of upstream PCI-to-PCI bridges.

11. The method of claim 10, further comprising querying a controller to determine what devices are assigned to said bus associated with said one of said plurality of upstream PCI-to-PCI bridges.

12. The method of claim 8, wherein said controller instructs said downstream port to perform a disconnect sequence from said bus associated with said CPU, and said controller instructs the downstream port to perform a connect sequence to a bus associated with said CPU.

13. A configurable PCI Express switch connecting a plurality of CPU complexes, comprising:
 a plurality of upstream PCI-to-PCI ports, each upstream port connected to one of said CPU complexes;
 a plurality of downstream PCI-to-PCI ports;
 a plurality of internal PCI buses, each internal PCI bus being connected to a respective upstream port; and
 a controller that configures which upstream port communicates to which downstream port,
 wherein each downstream port is connected to each internal PCI bus and wherein each downstream port only responds to one internal PCI bus,
 wherein said controller receives discovery requests through an interface associated with each CPU complex,
 wherein if a CPU requests access to a device enumerated to a second CPU, said controller initiates a request to said second CPU to release a downstream port to which said device is connected, and
 wherein if said request is granted, said second CPU acquiesces said device and initiates a grant to said controller for the release of the downstream port.

14. The switch of claim 13, wherein a CPU in communication with a predetermined one of said upstream ports is configurable to communicate with any of said downstream ports.

15. The switch of claim 13, wherein said controller instructs said downstream port to perform a disconnect sequence from said bus associated with said second CPU, and said controller instructs the downstream port to perform a connect sequence to a bus associated with said CPU.

* * * * *

UNITED STATES PATENT AND TRADEMARK OFFICE
CERTIFICATE OF CORRECTION

PATENT NO. : 7,058,738 B2  Page 1 of 1
APPLICATION NO. : 10/834138
DATED : June 6, 2006
INVENTOR(S) : Stufflebeam, Jr.

It is certified that error appears in the above-identified patent and that said Letters Patent is hereby corrected as shown below:

On the title page, item (54), in "Title", in column 1, line 2, after "MULTIPLE" delete "CPUS" and insert -- CPUs --, therefor.

On the title page, item (56), under "Other Publications", in column 2, line 1–2, delete "Communucation," and insert -- Communication, --, therefor.

In column 1, line 2, after "MULTIPLE" delete "CPUS" and insert -- CPUs --, therefor.

In column 5, line 29, delete "Sw1" and insert -- SW1 --, therefor.

Signed and Sealed this

Sixth Day of April, 2010

David J. Kappos
*Director of the United States Patent and Trademark Office*